3,512,749
PILOT OPERATED VALVE
Thomas E. Noakes, Detroit, and John E. McRae, Dearborn Heights, Mich., assignors to American Standard Inc., New York, N.Y., a corporation of Delaware
Filed Mar. 13, 1968, Ser. No. 712,728
Int. Cl. F16k 31/06
U.S. Cl. 251—30     5 Claims

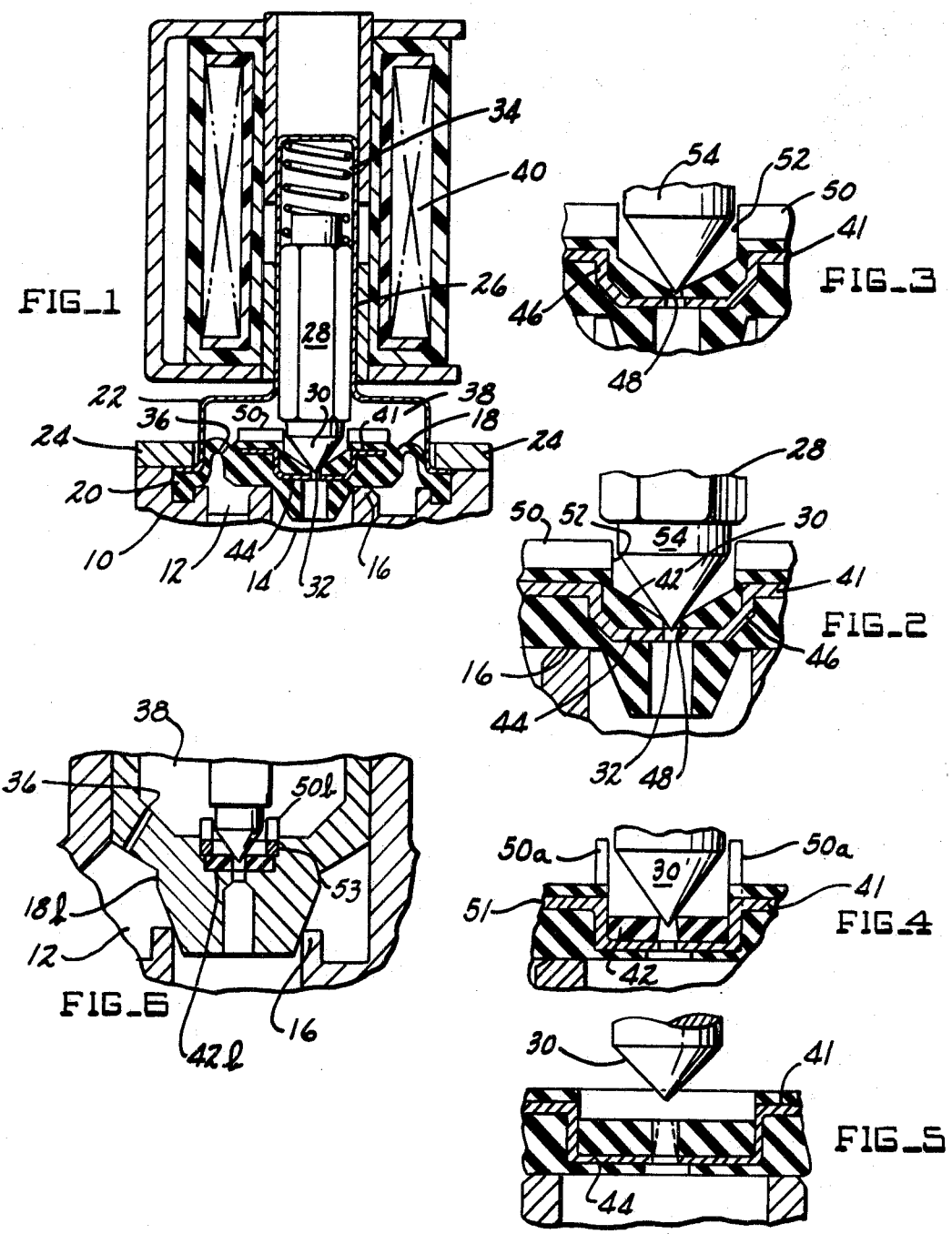

ABSTRACT OF THE DISCLOSURE

This invention proposes a pilot-operated, solenoid-controlled valve wherein the pilot valve opening is formed by a mass of resilient material which is deformable in response to pressure build-up within a control chamber so that when the pilot element is seated (i.e. closed) the size of the opening is reduced, thereby lessening the solenoid force required to open the element. Preferably the pilot element takes the form of a plunger mounted for straight-line movement and having a conical tip area registering the pilot opening; guide walls (defining cam surfaces) are disposed about the pilot opening to guide the tip into the opening even though the opening is in some cases very small, e.g. on the order of .03 inch.

THE DRAWINGS

FIG. 1 is a fragmentary sectional view of a valve embodying the invention.

FIG. 2 is an enlarged fragmentary view showing part of the FIG. 1 valve.

FIG. 3 is a view similar to FIG. 2, but showing a rubber component deformed in response to liquid pressure.

FIG. 4 is a view similar to FIG. 3 but showing a different embodiment.

FIGS. 5 and 6 are views illustrating further embodiments in the invention.

THE DRAWINGS IN DETAIL

FIG. 1 illustrates a pilot-operated solenoid valve of the type shown for example in U.S. Pat. 2,837,282. Such a valve comprises a valve body 10, plastic or metal, having an annular liquid inlet 12, concentric outlet 14, and intervening annular valve seat 16. The main valve element controlling flow across the seat comprises a flexible diaphragm 18 having its peripheral edge area 20 clamped and sealed to the valve body by means of a conventional cover 22 and clamping plate 24; screws, not shown, go through plate 24 into the valve body to maintain the parts relationship.

Disposed within the cylindrical tubular guide portion 26 of cover 22 is a feromagnetic armature plunger 28 of hexagonal cross section but having a conical lower tip area 30 registering with a pilot opening 32 in the main valve element. In its FIG. 1 position the plunger is biased against opening 32 by a compression coil spring 34; liquid from inlet 12 flows through one or more small ports 36 in the diaphragm where it is then trapped in the pressure chamber 38 formed between cover 22 and the diaphragm. Chamber 38 pressure maintains the diaphragm in the FIG. 1 closed position. When the conventional solenoid coil 40 is electrically energized armature 28 is drawn upwardly so that chamber 38 pressure is vented or exhausted through opening 32. The pressure in the annular inlet 12 then forces the diaphragm 18 upwardly away from seat 16, thus allowing main flow.

As thus far described, the valve may be considered conventional. A new feature may be the utilization of a mass of pressure-responsive material 42 positioned on the upper face of a non-deformable wall 41, said wall being formed or located as an insert during the diaphragm-molding operation. As shown, wall 41 is of cup-shaped character comprising a flat planar wall portion 44 and an annular upstanding side wall portion 46. Such a configuration confines the mass 42 so that high liquid pressures in chamber 38 produce an axial sequeezing action thereon. The mass cannot move down axially so that instead the material shifts radially inwardly to reduce the size of flow opening 48; this is shown best by a comparison of FIG. 2 (low pressure) and FIG. 3 (high pressure).

The actual chamber 38 pressure is a function of the supply pressure at inlet 12, which is in turn different for different geographical areas (size of the pipes, number of users, pumping station capacity, etc.). The supply pressure can for example be relatively low, e.g. twenty p.s.i. or relatively high, e.g. eighty p.s.i. The valve must be manufactured to handle the range of pressures, and the number of solenoid turns must be chosen accordingly. Solenoid turns are chosen in relation to the power required to lift the armature 28; this is the mathematical product of the area of flow opening 48 and the chamber 38 pressure (against which the armature must lift). What we are attempting in the FIG. 2, 3 valve is to make the product of flow opening area and liquid inlet pressure the same irrespective of the absolute pressure valve which may exist in any given installation; this enables a given number of coil turns to be sufficient, and prevents having to overdesign or overcost the valve to meet high pressure conditions which may exist only in isolated geographical areas.

As before noted, the mass of material 42 is confined so that it responds to pressure by shifting radially inwardly in an amount proportioned to the pressure existing above the diaphragm. We thus believe we will achieve the desired constant armature lift power characteristic.

The aforementioned supply pressure variations are of course a coil design factor only when the armature is considered in the closed position. When the armature is in the raised position the chamber 38 pressure is vented so that mass 42 relaxes to its FIG. 2 size. This relaxation characteristic is advantageous in that it lets the opening 48 pass any foreign particles which might otherwise tend to clog the opening. Opening 48 can therefore be formed large enough (relaxed position) to pass solids but small enough to economize on coil turns, even when supply pressures are high.

Conventionally the flow opening for the armature has been formed with a diameter of about .05 inch. This was in part due to difficulties in causing the conical tip to properly seek out the flow opening under all operating conditions. Thus, such factors as non-concentricity of the conical tip in relation to the edges of the hexagonal armature cross section, nonconcentricity of the guide tube 26 with relation to the rubber member, radial non-uniformity in the magnetic field, non-axial line of action of spring 34, distorting action of the liquid inlet pressure, etc. have tended to produce a slight cocking or off-center movement of the armature which caused its tip area to strike rubber points outside the opening corresponding to opening 48. It would be desirable, for coil size economy reasons, to make opening 48 smaller than .05 inch, e.g. .03 inch. We therefore propose the addition of three or more guide walls 50, shown in FIGS. 1 and 2 as ribs integral with the rubber material. The inner side edges 52 of these ribs are centered about the axis of flow opening 48, and are so spaced as to circumscribe a circle which has a diameter only slightly greater than the diameter of the plunger cylindrical portion 54.

Should the armature come down slightly off center or cocked, its conical tip surface 30 will be cammed to a centered position by contact with rib edges 52. The tip will therefore seek out the opening 48 even when opening 48 is of small diameter. Ribs 50 do not interfere with the seating action of the armature, and do not form part of the seat; hence they do not increase the seat area or armature lift requirements.

In FIG. 2 resilient mass 42 is preferably not bonded to surfaces 44 and 46; therefore the rubber mass tends to have a bodily sliding action on surface 44. If desired the rubber mass can be bonded to wall 41, as in FIG. 4. When so bonded the rubber mass responds to fluid pressure so that its upstream face area deforms inwardly while its downstream face area remains adhered to wall 41. FIG. 4 shows the rubber member when subjected to high pressure. The relaxed low pressure condition of the flow opening would be approximately as shown in FIG. 5.

The essential difference between FIGS. 4 and 5 is that FIG. 4 includes guide ribs 50a formed integrally with wall 41, as for example by portions struck out from the outer wall areas 51. These ribs function in the manner of previously described walls 50 (FIG. 2).

FIG. 6 illustrates the invention applied to a piston type valve. The general action is the same as previously described, since the piston 18b moves vertically in the manner of diaphragm 18. The piston is preferably a one piece metallic element having a cavity in its upper face for containing the mass of deformable material 42b. It is believed that pressure response of material 42b will be similar to the response of material 42. Guiding of the piston 28b can be accomplished by fingers 50b formed as projections integral with an annular insert 53 press fit or otherwise secured to piston 18b. If mass 42 is not bonded to the piston the insert 53 can act as a retainer for the rubber element.

Preferably in each case (FIGS. 2, 4, 5 or 6) the resilient mass 42 or 42b should have a fairly large axial dimension so that sufficient material is available to shift radially for changing the size of the flow opening; thus the rubber mass must be more than paper thin, e.g. .1 inch or more. The rubber mass must also at least approach line contact with the armature; otherwise the effective area against which the armature must lift is undesirably increased.

In the FIG. 2 form the objectives of adequate mass and line contact are achieved as a compromise; thus the area defining opening 48 has only a small edge contact surface while the outer areas of the rubber structure are thickened axially. In FIGS. 4 and 5 the line contact is achieved by the aforementioned bonding of the rubber to the metal insert 41; the area which defines the flow opening thus tends to shift inwardly only at the upstream face instead of bulging in at other points, thereby effecting line contact with the conical surface 30.

The drawings show the invention applied to pilot operated solenoid valves wherein the pilot armature 28 closes on a deformable seat carried by the main valve element. It is possible of course to use the invention in valves where the pilot armature works against a deformable seat carried in a fixed location on the valve body, see for example U.S. Pat. 3,289,697.

What is claimed is:

1. A pilot-operated solenoid valve comprising means forming an inlet and an outlet; a main valve seat operatively located between the inlet and outlet; a main valve element movable toward and away from the seat to control flow therepast;

means forming a pressure chamber communicating with the inlet to receive pressure fluid therefrom; said main valve element having a first face engageable with the main seat, and a second face exposed to the pressure chamber, whereby high fluid pressures within said chamber cause the main valve element to move toward the main seat; said main valve element including a nondeformable back-up wall having a liquid exhaust port extending therethrough for conducting fluid from the pressure chamber to the valve outlet;

said main valve element comprising an annular mass of resilient deformable material positioned on the face of the back-up wall which is exposed to the pressure chamber; said resilient mass having a flow opening therethrough aligned with the port opening, and said resilient mass being responsive to pressure conditions within the pressure chamber so that high chamber pressures reduce the size of said flow opening and low chamber pressures allow relaxation of the mass to thus increase the size of the flow opening;

and solenoid means comprising an armature movable within the pressure chamber toward and away from the flow opening in the resilient annular mass, the condition of highest pressure within the chamber existing when the armature is seated against the resilient mass so that the flow opening therein is of reduced size when the solenoid force is initially applied to the armature to draw same way from the opening;

said armature comprising a plunger having a conical tip presented to the aforementioned deformable mass whereby to seat within the flow opening; said pressure chamber being formed in part by a tubular guide which restricts the plunger to substantially straight line movement; said main valve element having guide walls which define a plurality of cam surfaces centered about the axis defined by the flow opening in the deformable mass; the space circumscribed by said cam surfaces being only slightly greater than the cross sectional dimension of the plunger, whereby slight off-center movement of the plunger in the valve-closing direction causes one or more of said cam surfaces to redirect the plunger so that its conical tip seeks the flow opening in the deformable mass;

the flow opening in the resilient mass having a sharp edged juncture with the upstream face of the resilient mass so that said juncture has substantially line contact with the plunger tip surface when the tip is closed against the opening; the resilient mass being oriented to the back-up wall so that radial shifting of resilient mass takes place primarily along its upstream face, whereby variation in the size of the flow opening varies the effective flow area which the armature must lift against to move from the closed to the open position.

2. The solenoid valve of claim 1 wherein the main valve element comprises a flexible diaphragm of resilient deformable material; said non-deformable wall being formed as a metallic insert within the diaphragm; said guide walls being formed as integral parts of the metallic insert.

3. The solenoid valve of claim 1 wherein the main valve element comprises a flexible diaphragm of resilient deformable material; said non-deformable wall being formed as a metallic insert within the diaphragm; said guide walls being formed integrally with the diaphragm material.

4. The solenoid valve of claim 1 wherein the resilient mass is bonded to the upstream face of the back-up wall, whereby said mass has a hinge-like movement in response to fluid pressure changes on its upstream face.

5. The solenoid valve of claim 1 wherein the resilient mass is slidably seated on the upstream face of the back-up wall.

References Cited

UNITED STATES PATENTS

| | | | |
|---|---|---|---|
| 2,712,324 | 7/1955 | Lund | 251—30 X |
| 2,826,367 | 3/1958 | Cobb | 251—30 X |
| 2,888,237 | 5/1959 | Dahl | 251—141 X |
| 2,942,837 | 6/1960 | Bauerlein | 251—30 X |
| 2,946,551 | 7/1960 | Kovach | 251—30 |
| 2,994,505 | 8/1961 | Brakebill | 251—30 X |

ARNOLD ROSENTHAL, Assistant Examiner

U.S. Cl. X.R.

251—141